UNITED STATES PATENT OFFICE.

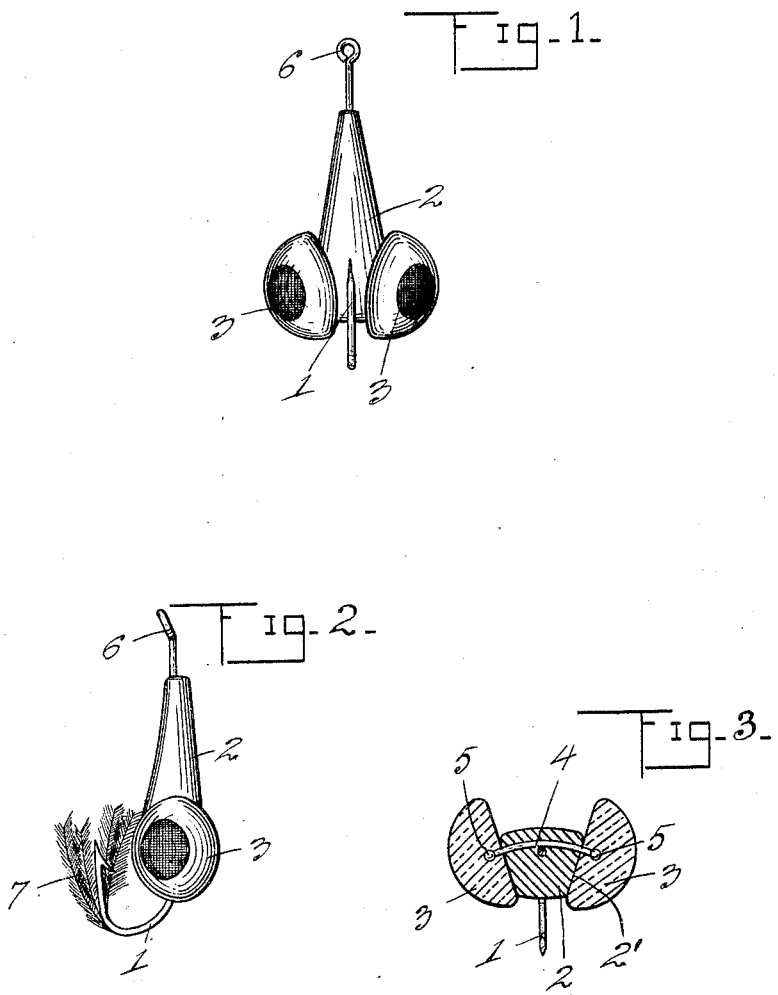

RICHARD A. LAMBERT, OF TACOMA, WASHINGTON.

ARTIFICIAL FISH-BAIT.

1,067,178.  Specification of Letters Patent.  Patented July 8, 1913.

Application filed February 21, 1913. Serial No. 749,962.

*To all whom it may concern:*

Be it known that I, RICHARD A. LAMBERT, a citizen of the United States, residing at Tacoma, in the county of Pierce and State of Washington, have invented certain new and useful Improvements in Artificial Fish-Bait, of which the following is a specification.

This invention relates to artificial fish bait wherein bait, hook, and sinker are made integral.

It is a well known fact that eyes are excellent fish bait and the inventor has for his purpose to provide a hook where artificial eyes are used to attract the fish and still combine the sinker, hook and bait in one device in such a way as to eliminate the necessity of carrying the several parts separately.

The object of my device is to provide a fish hook which will serve the purpose of both bait and sinker and thereby eliminate the necessity of carrying an extra supply of bait.

Referring to the drawings,—Figure 1 is an elevation of my invention, as will appear when looking directly toward the hook. Fig. 2 is a side elevation of Fig. 1, and Fig. 3 is a cross section taken directly through the center of the eyes.

Referring more particularly to the drawings, 1 indicates a fish hook; 2 is a lead sinker cast around the hook 1 and formed integral therewith, the said sinker being provided with flat surfaces, as shown at 2' against which artificial eyes 3 which are made of any suitable material, such as glass, celluloid or the like are secured by means of a wire or bar 4 which is provided at each end with heads 5 adapted to be inserted in the recesses formed in the backs of the eyes 3. I provide at the upper end of the hook the loop 6 which is adapted to be attached to the end of a fishing line in the usual manner. Around the point of the hook I preferably arrange a tuft of feathers 7 which are adapted to conceal the point of the hook in such a manner that a fish upon seeing the device will attempt to nibble at the artificial eyes and will be caught on the hook.

It is to be understood that the artificial eyes 3 may be made of any suitable material and sizes to suit the user's fancy.

While in the foregoing I have shown and described the preferred embodiment of my invention, I wish it to be understood that I may change the specific arrangement of parts without in any way departing from the spirit and scope of my invention.

Having thus fully described my invention, what I claim is:—

As an article of manufacture, a fish hook, a sinker cast around the shank of said hook, eyes having recesses, a bar having heads formed thereon adapted to engage the recesses in the eyes, said bar being cast in the said sinker adjacent the shank, and said eyes engaging the heads on the bar.

In testimony whereof I affix my signature in presence of two witnesses.

RICHARD A. LAMBERT.

Witnesses:
 DELIA LAMBERT,
 E. KNEILING.

Copies of this patent may be obtained for five cents each, by addressing the "Commissioner of Patents, Washington, D. C."